United States Patent [19]

Park

[11] Patent Number: 5,719,618
[45] Date of Patent: Feb. 17, 1998

[54] LOCKING METHOD FOR A SYSTEM WITH AN ON SCREEN DISPLAY FUNCTION AND APPARATUS THEREFOR

[75] Inventor: Jin-su Park, Seongdong-ku, Rep. of Korea

[73] Assignee: SamSung Electronics Co., Ltd., Suwon, Rep. of Korea

[21] Appl. No.: 24,495

[22] Filed: Mar. 1, 1993

Related U.S. Application Data

[63] Continuation of Ser. No. 681,843, Nov. 21, 1990, abandoned, which is a continuation of Ser. No. 398,927, Aug. 28, 1989, abandoned.

Foreign Application Priority Data

Dec. 31, 1988 [KR] Rep. of Korea .................. 88-18099

[51] Int. Cl.[6] .................................................. H04N 7/167
[52] U.S. Cl. .................................................. 348/5.5; 380/20
[58] Field of Search .................................... 380/4, 20, 25, 380/49; 358/349; 348/5.5

[56] References Cited

U.S. PATENT DOCUMENTS

| | | | |
|---|---|---|---|
| 4,510,623 | 4/1985 | Bonneau et al. | 455/181 |
| 4,620,229 | 10/1986 | Amano et al. | 358/194.1 |
| 4,797,918 | 1/1989 | Lee et al. | 380/20 |

*Primary Examiner*—Stephen C. Buczinski
*Attorney, Agent, or Firm*—Robert E. Esq.

[57] ABSTRACT

A locking method for system with OSD function is disclosed, which comprises;
  a procedure of waiting for the lock-function call; a procedure of storing and displaying the inputted secret code by using the OSD function when the lock-function is called; a prodecure of checking whether the system is in the locked state after the secret code input is completed; a procedure of storing the inputted secret code and locking the system if the system is not in locked state; a procedure of comparing the inputted secret code with the secret code already stored if the system is in locked state; a procedure of displaying error message by making use of the OSD function if the secret codes don't match each other; a procedure of unlocking the system if the secret codes match each other.

The present locking method enables the system already having OSD function to lock itself without additional display unit by using the OSD function.

8 Claims, 5 Drawing Sheets

LOCKING METHOD FOR A SYSTEM WITH AN ON SCREEN DISPLAY FUNCTION AND APPARATUS THEREFOR

This is a continuation of application Ser. No. 7/681,843, filed 21 Nov., 1990, which is a continuation of Ser. No. 07/398,927, filed 28 Aug., 1989, both abandoned.

FIELD OF THE INVENTION

The present invention relates to the locking method for a system with on-screen display(OSD) function, especially to a system-locking method using the OSD function without requiring an additional display unit for the systems such as video tape recorder(VTR), etc. having an OSD function.

An apparatus including a video and audio locking system is also disclosed.

BACKGROUND OF THE INVENTION

The locking device on a VTR is generally used for the purpose of keeping children from watching adult video programs, by preventing their reproduction. The conventional locking device for the above purpose is used to display the status of the secret codes being inputted by the viewer on an additional display unit such as a digitron, when locking or unlocking the VTR. Meanwhile, the character generator circuit is generally incorporated in the video processing system such as VTR or digital television for displaying warning information, channel or other character information on a monitor.

SUMMARY OF THE INVENTION

The object of this invention is to provide a system-locking method using the OSD function without requiring an additional display unit, if the system already has an OSD function.

In achieving the above object, the locking method in accordance with this invention which is used for a system having an OSD function comprises;

the 1st procedure—Waiting for lock-function access in the system power standby state;

the 2nd procedure—If the lock-function is called for in the 1st procedure, the OSD function is utilized to display the lock-function setting status. As the viewer inputs the secret code sequentially, the secret code inputted, then, is stored and displayed sequentially on the screen;

the 3rd procedure—After the secret-code input is completed, a check is made as to whether the current status of the system is in the locked state or not;

the 4th procedure—If the current status of the system is not in the locked state in the 3rd procedure, the input secret code is memorized as the system's lock secret code. The on-screen display in the 2nd procedure is cleared, and the system is set to the locked state;

the 5th procedure—If the current status of the system is verified to be in the locked state, the newly input secret code is compared with the secret code already stored during the 2nd procedure, to determine if they match;

6th procedure—If they don't match in the 5th procedure, an error message, that tells of the discrepancy, is displayed;

7th procedure—If they match in the 5th procedure, the stored lock secret code is initialized and the lock secret code displayed during the 2nd procedure are initialized and the system is unlocked.

BRIEF DESCRIPTION OF THE DRAWINGS

The above objects and advantages of the present invention will, become more apparent by describing the preferred-embodiment of the present invention in more detail with reference to the attached drawings wherein.

DETAILED DESCRIPTION OF THE INVENTION

Figure 1:
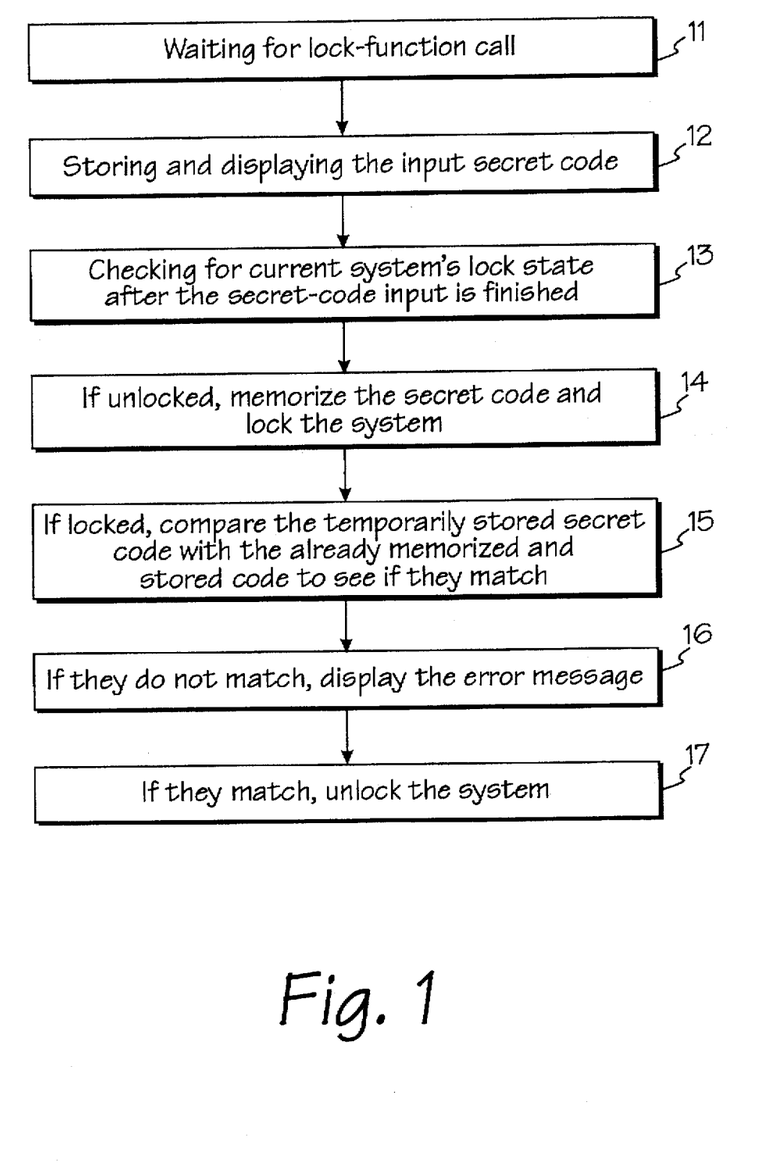
FIG. 1 is a flow chart of system-locking method employing an OSD function in accordance with the present invention.

FIG. 1. is a system diagram of the locking method in accordance with the present invention. The drawing shows procedures such as, 11—waiting for lock-function call; 12—storing and displaying the secret code input to the above procedure 11; 13—checking if the system is in the locked state as soon as the above secret code input is completed; 14—if the system is not in the locked state in the above procedure 12, the system converts for storing of the secret-code and for setting to the locked state; 15—if it is in the locked state in the above procedure 13, the stored secret code is compared with the already memorized code, to see if they match; 16—if the secret codes don't match, display the error massage; 17—if the secret codes match; the system is unlocked.

Figure 2:
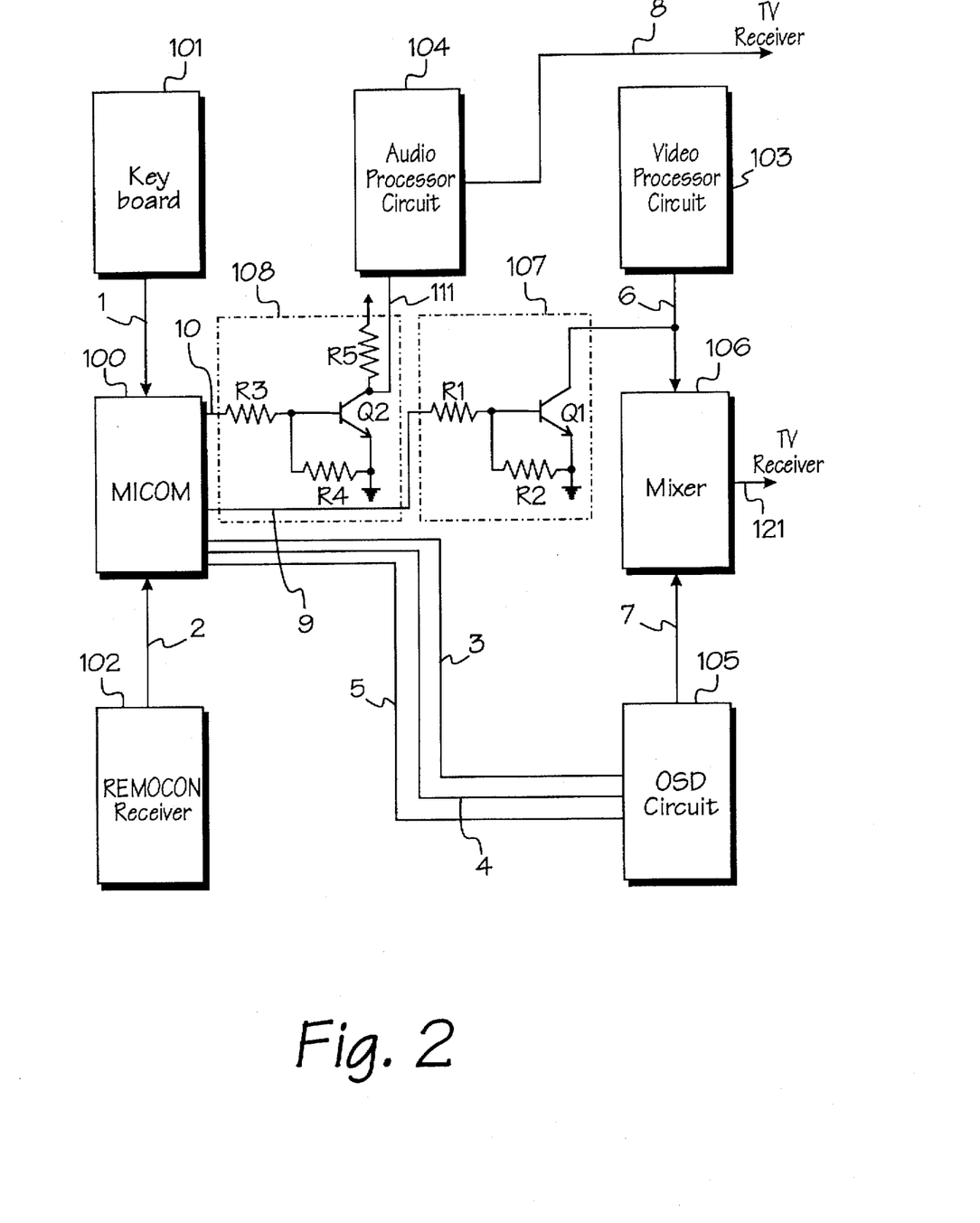
FIG. 2 is a block diagram of VTR suitable for employing this invention.

FIG. 2 is a circuit diagram of VTR suitable for employing the method of this invention. It consists of a microcomputer 100 that controls the VTR system; a key matrix 101 that conveys the information provided by the viewer to the above microcomputer 100; a remote-control receiver 102 that receives and transforms the transmitted remote-control signals to digital key-data, and conveys it to the microcomputer 100; a video-signal processing unit 103 that reproduces and outputs the video-signal (to be called 'the 1st video signal' from now on) recorded on the video tape; a voice-processing unit 104 that reproduces the video tape's voice signals and transmits them to the television set; a character-generator circuit 105 that obtains from the microcomputer 100 data for characters and generates a video signal (to be called the 2nd video signal from now on) that forms character-data for the screen; a mixer 106 that receives and mixes the 1st and 2nd video signals from the video-signal processing unit and the character-generator circuit, respectively, to output them to the television set; a video-mute circuit 107 that consists of a transistor Q1 and two resistors R1 and R2 and, under the microcomputer's control, mutes the video-processing unit's output; and a voice-mute unit 108 that consists of a transistor Q2 and three resistor R3–R5 and, under the microcomputers control, mutes the voice signals from the voice-processing unit 104.

The following is a description of an operation of the system in the diagram of FIG. 2.

The keyboard 101 generates key data equivalent to the information input by the viewer and outputs it to the microcomputer 100. The remote-control receiver 102 receives the remote-control signals for key-data transmitted from remote-control transmitter, transforms them into digital key-data and outputs the latter to the microcomputer 100.

The microcomputer 100 controls the system,as dictated by its built-in program according to the key-data inputted either from the keyboard 101 via bus line 1 or from the above remote-control receiver 102 via bus line 2. The video-processing unit 103 extracts the video program recorded on the video tape, demodulates the 1st video signal and outputs it to the mixer 106 via line 6. The voice-processing unit 104 extracts the video program recorded on the video tape, demodulates the voice signal included in the video program and outputs it to the television set, via line 8. The character-generator circuit 105 generates the 2nd video signal that forms the character-information for the screen by obtaining the system-clock and strobe signals from the microcomputer 100 via three lines 3–5, together with the character-data input. The circuit then outputs the signal to the mixer 106 via line 7. The mixer 106, in turn, mixes the output from the video-processing unit 103 with the output of the character generator circuit 105, for output to the television set via line 121.

The video-mute unit 107 consists of two resistors R1 and R2 and a transistor Q1. It mutes the output of the video-processing unit 103, that is, the 1st video signal on line 6, according to the video-mute control signal received from the microcomputer via line 9. If the logic status of the video-mute control signal is high, the 1st video signal on line 6 is muted and kept from being input to the mixer 106. On the contrary, if it is low, the transistor Q1 goes off, and the 1st video signal on line 6 is input to the mixer 106. The voice-mute unit 108 consists of three resistors R3–R5 and a transistor Q2. It controls the audio-processing unit 104 according to the microcomputer's audio-mute control signal received via line 10. If the logic status of the microcomputer's audio-mute control signal, is high, a mute signal of low-logic status is generated and sent via line 11 to the audio-processing unit 104 to enable it to mute the audio signal. On the contrary, if it is low, a mute signal of high-logic status is generated and sent via line 11 to the audio-processing unit 104 to enable it to output the audio signal to the television set.

The lock-function executed by a micro-computer as illustrated in the FIG. 3 will be explained in detail while also referring to FIG. 2 and FIG. 4.

Figure 3A:
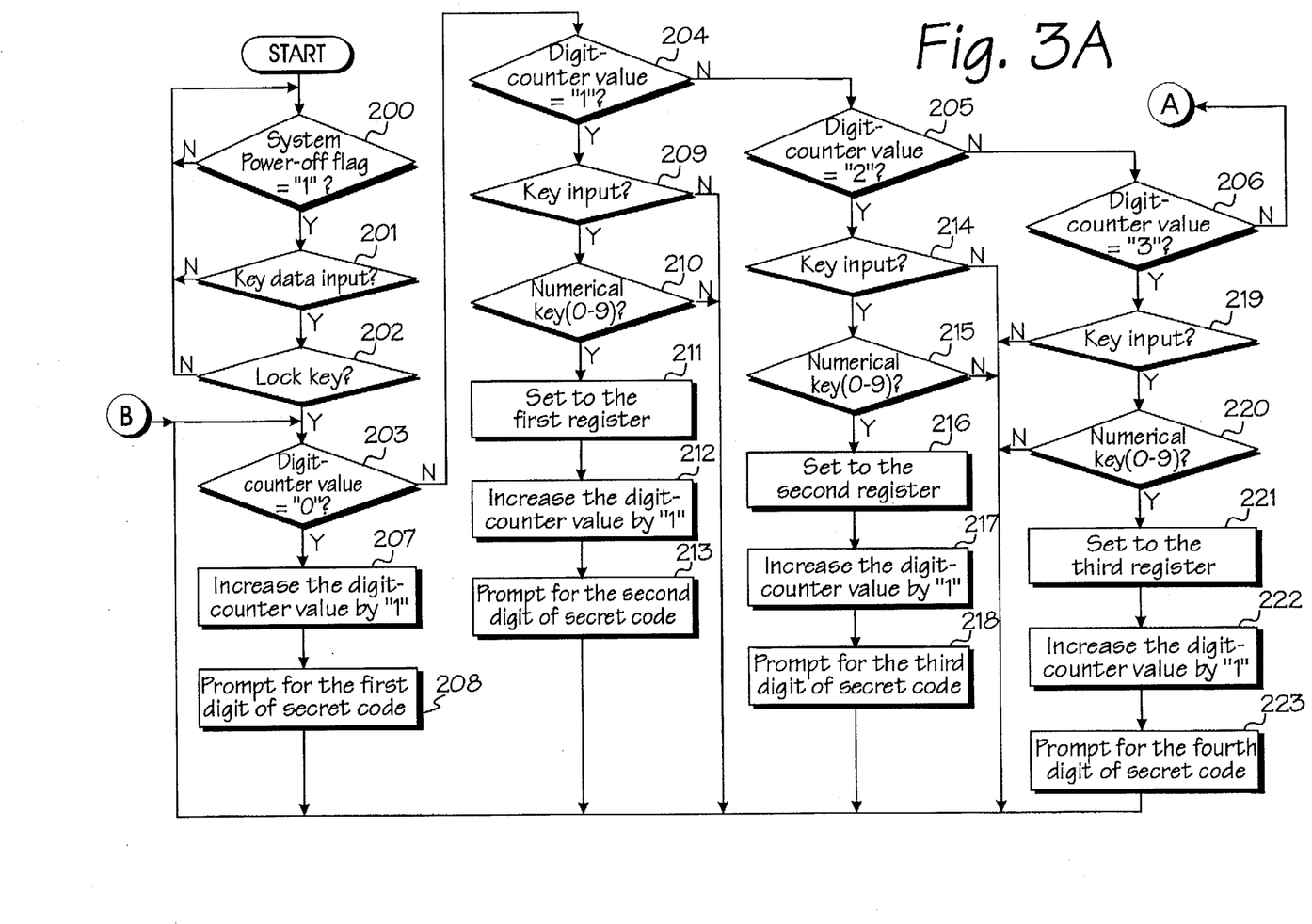
FIGS. 3A and 3B comprise a flow chart for a lock-function program executed by a micro-computer shown in the diagram of FIG. 2.

While executing the main program, the micom 100 checks if the system's power-off flag is set to "1" to determine the main-power status. If the mains-power status is on, with its system power-flag set to "0", it returns to the main program (step 200). On the contrary, if the flag is set to "1", i.e., power-standby status, it determines if there is key input by checking the key-data input from keyboard 101 or remote-control receiver 102 through bus line 1 or bus line 2(step 201).

If there is no key-data input in the above step 201, the micom 100 returns to the main program. If there is key-data input, it checks if the key data concerns the lock key. if not, the micom 100 returns to the main program(step 202).

If the key data input in the above step 202 concerns the lock key, the micom 100 executes steps 203–227 to display the multi-digit secret-code prompt screen on the television set, through the character-generator circuit 105 and stores the sequentially-input secret codes on the registers.

The detailed process is as follows;

The micom 100 checks the value of its built-in secret-code digit counter in steps 203–206, to see if it should wait for the secret-code input, or to determine which digit of the secret code should be input.

If the value of the secret-code digit counter is "0" in step 203, the value is increased by "1" (step 207). The character data for the cue display for the first digit of the secret code, together with system clock and strobe signals, are sent to the character-generator 105 via three lines 3–5 (as in step 300 of FIG. 4). The character-generator 105 forms the 2nd video signal (as in step 300 of FIG. 4) and sends it via line 7, the the mixer 106 and line 12 to the television set. The viewer is then required to input the first of the secret code (step 208). If the value of the secret-code digit counter is "1" in the step 204, the micom 100 recognizes this as the input prompt for the first digit of the secret code. It then checks for the key data is inputted from the keyboard 101 or remote-control receiver 102(step 209). If key data is inputted, it checks whether the key data is a numerical key (0–9)(step 210). If the key data input in the above step 210 is a numerical key, the micom 100 stores the number in the first-digit register as the first digit of the secret code (step 211). The value of the digit counter is then increased by "1" (step 212) and the character data for the secret code's second-digit prompt display such as 301 as shown in FIG. 4 is sent to the character-generator 105. The micom (100) makes the character-generator (105) send the character-data via mixer (106) to the television set to prompt for the second digit of the secret code, and returns to step 203 (step 213).

If the value of the secret-code digit counter is "2" in step 205, the micom 100 recognizes this as the input prompt for the second digit of the secret code. It then checks for the key data from the keyboard 101 or remote-control receiver 102 (step 214). If key data is input, it is checked to determine if it is a numerical key (0–9)(step 215). If the key data input in the above step 215 is a numerical key, the micom 100 stores the number in the second-digit register as the second digit of the secret code (step 216). The value of the digit counter is then increased by "1" (stet 217) and the character data for the secret code's third-digit prompt display such as 302 as shown in FIG. 4 is sent to the character-generator 105. The micom 100 makes the character-generator 105 send the character data via mixer 106 to the television set to prompt for the third digit of the secret code and returns to step 203 (step 218).

If the value of the secret-code digit counter is "3" in the above step 206, the micom 100 recognizes this as the input prompt for the third digit of secret code. It then checks whether the key data is input from the keyboard 101 or remote-control receiver 102 (step 219). If key data is input; it checks if it is a numerical key (0–9)(step 220), If the key data input in the above step 220 is a numerical key, the micom 100 stores the number on the third-digit register as the third digit of the secret code (step 221). The value of the digit counter is then increased by "1" (step 222) and the character data for the secret code's third-digit prompt display such as 303 as shown in FIG. 4 is sent to the character-generator 105. The micom makes the character-generator 105 send the character data via mixer 106 to the television set, as the prompt for the fourth digit of the secret code, and returns to step 203 (step 223).

If the value of the secret-code digit counter is not "3" in the step 206, the micom 100 recognizes this as the input prompt for the fourth digit of the secret code. It then checks whether the key data is input from the keyboard 101 or remote-control receiver 102 (step 224). If key data is input in the step 224, it checks whether it is a numerical key (0–9)(step 225). If the key data input in the above, step 225 is a numerical key, the micom 100 stores the number on the fourth-digit register as the fourth digit of the secret code (step 226). The character data for the secret code's fourth-digit prompt display such as 304 as shown in FIG. 4 is sent to the character-generator 105 (as in step 304 of FIG. 4). The micom makes the character-generator 105 send the character data via mixer 106 to the television set, to prompt for the fourth digit of the secret code (step 227).

Figure 3B:
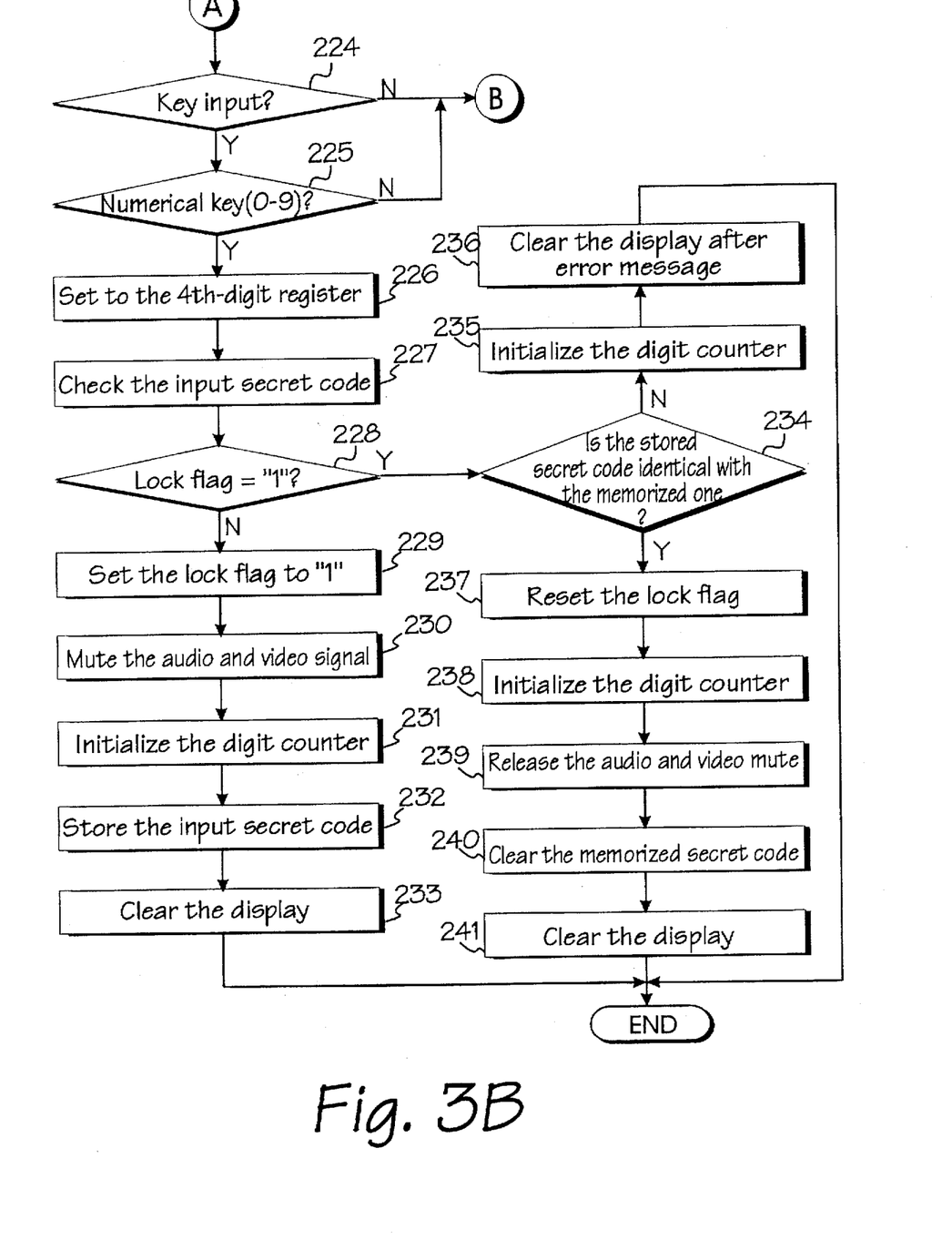

After executing step 227, the micom 100 checks if the lock flag is set to "1" to determine if the system is in the locked state (step 228).

If the lock flag is reset to "0" in the step 228, the micom 100 judges the system to be set to the unlocked state and sets the reset lock flag to "1" to change the state to the locked state (step 229). The video-mute and audio-mute control signals with high -logic states are then outputted via the respective lines 9 and 10 to the video-mute unit 107 and the audio-mute unit 108. Thus, the video-mute unit (107) diverts the output of the video-processing unit 103 on line 6 to ground terminal, to prevent viewing of the video program. The audio-mute unit 108 generates a mute signal of low-logic state and sends it to the voice-processing unit 104 (step 230). The unit 104 prevents the voice data from being output, as the voice signal's output to the television set is barred by the low-logic state mute signal.

Figure 4:
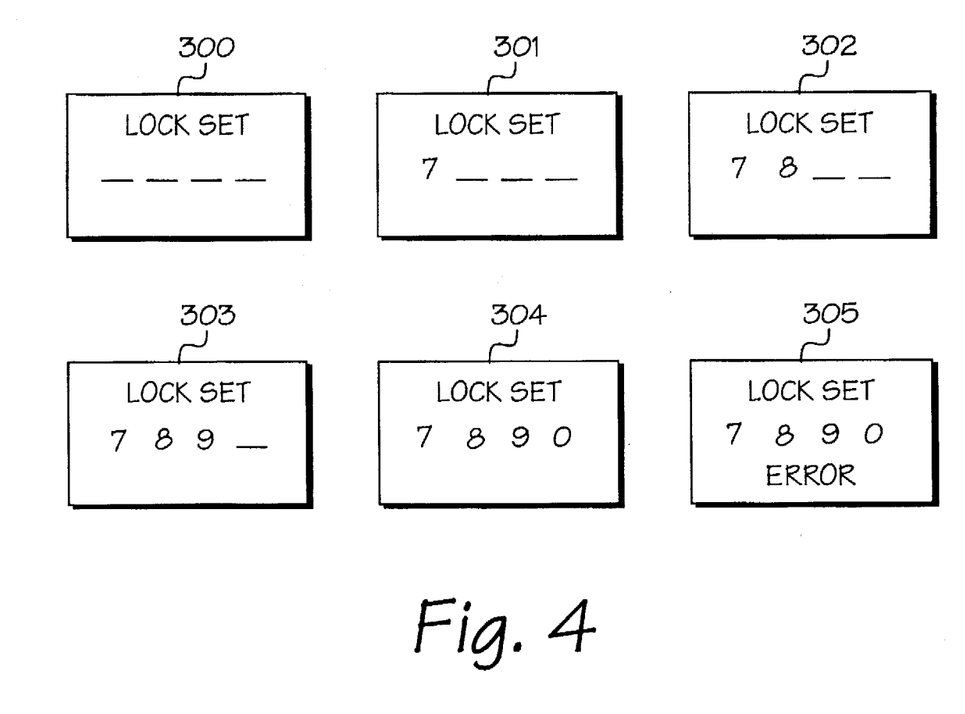
FIG. 4 is a status diagram of, a display screen during the execution of program shown in the flow chart of FIG. 3.

After executing the above step 230, the micom 100 resets the value of its secret-code digit counter to "0" (step 231), stores the secret code, already stored in each digit register, in the memory's secret-code storage address (step 232) and stops the strobe signal going to the character-generator circuit 105 to clear the display of step 304 in the FIG. 4 (step 233).

Meanwhile, if the lock flag is set to "1" in the step 228, the micom 100 judges that the system is already set to the locked status and compares the secret code temporarily stored in each digit's register with the secret code stored in the memory's secret-code storage address, to determine if an authorized viewer is accessing the system (step 234).

In case the two secret codes don't match in the step 234, the micom 100 determine that an unauthorized viewer is accessing the system and resets the value of the secret-code digit counter to "0" (step 235). It then sends the character data for error message (as shown in step 305 of FIG. 4) to the character-generator 105, to make it display the error-message through the mixer 106 on the TV set, for a certain period of time. The micom 100 then stops giving the strobe signal, to clear the error-message display as shown in step 305 of the FIG. 4 (step 236).

If the two codes compared n step 234 are identical, the micom 100 decides that an authorized viewer is accessing the stem and resets the lock flag to "0" to unlock the system (step 237). It then initializes the secret-code digit counter to "0" (step 238) and generates video- and audio-mute unit control signals low-logic status. These are output via each (9 and 10) to the video-mute unit 107 and audio-mute unit 108. The video-mute unit's muting operation is deactivated, to enable the viewer to watch the video program, and audio-mute unit 108 changes the low-logic status of the mute signal to high-logic status and sends it to the audio-processing unit 104 (step 239). The audio-processing unit 104, prompted by the high-logic status audio-mute signal, transmits the audio signal to the television set to enable the viewer to hear the voice data.

After executing step 239, the micom 100 initializes the secret code temporally stored in each digit register to "0" (step 240), stops providing the character-generator 105 with strobe signals to deactivate it, and clears the display (as shown in step 304 of the FIG. 4)(step 241). As illustrated above, the main advantage of this invention lies in the fact that it can bar unauthorized people from watching video programs, and unlocks the system to allow authorized people to view these programs, without requiring an additional display unit, by using the OSD function.

What is claimed is:

1. A method for operating a video cassette recorder having a playback mode of operation for reproducing a video tape and a standby mode of operation wherein the video tape is not reproduced, the video cassette recorder including a microcomputer, at least one input device, a video signal processor generating a first video signal, a character generator receiving first control signals from the microcomputer for generating second video signals including character data, a mixer receiving said first video signals and said second video signal and providing a mixed video signal to a first output terminal and an audio signal processor providing an audio signal to a second output terminal, said first output terminal and said second output terminal being adapted to supply reproducible video signals and reproducible audio signals to an external television, said method comprising the steps of:

(a) when the video cassette recorder is in said standby mode of operation, receiving a lock function code from said input device;

(b) providing a code sequence to said microcomputer via said input device;

(c) passing said code sequence to said character generator for inclusion in said second video signal;

(d) when a last character of said code sequence is received by said microcomputer, immediately verifying the status of the video cassette recorder so as to determine whether said video cassette recorder is in a locked state or in an unlocked state;

(f) when said video cassette recorder is in said unlocked state, immediately generating a second control signal and a third control signal to terminate transmission of said first video signal to said mixer and said audio signal to said second output terminal, respectively;

(g) when said video cassette recorder is in said locked state, immediately comparing a stored previous code sequence with said code sequence;

(h) when said code sequence and said previous code sequence match, immediately terminating transmission of said second control signal and said third control so as to permit output of said first video signal and said audio signal; and (i) when said code sequence and said previous code sequence match, passing different first control signals to said character generator for inclusion of an error indication in said second video signal.

2. A video cassette recorder having a playback mode of operation for reproducing a video tape and a standby mode of operation wherein the video tape is not reproduced, said video cassette recorder comprising:

a microcomputer;

at least one input device providing a coded sequence and a lock function signal to said microcomputer;

a video signal processor generating a first video signal;

a character generator receiving first control signals from the microcomputer for generating second video signals including character data;

a mixer receiving said first video signal and said second video signal and providing a mixed video signal to a first output terminal; and an audio signal processor providing an audio signal to a second output terminal, said first output terminal and said second output terminal respectively supplying reproducible video signals and reproducible audio signals to an external television, said video cassette recorder receiving said lock function signal only in said standby mode of operation, said microcomputer responding to a last character of said code sequence received by said microcomputer by immediately verifying the status of the video cassette recorder to determine whether said video cassette recorder is in a locked state and whether said video cassette recorder is in an unlocked state.

3. The video cassette recorder according to claim 2, further comprising:

a video muting circuit coupled between said video signal processor and said mixer for transmitting said first video signal; and an audio muting circuit operatively coupled to said audio processor;

said microcomputer for immediately providing a second control signal and a third control signal to said video muting circuit and said audio muting circuit to terminate transmission of said first video signal to said mixer and said audio signal to said second output terminal, respectively, when said video cassette recorder is in said unlocked state;

said microcomputer for immediately comparing a stored previous code sequence with said code sequence when said video cassette recorder is in said locked state;

said microcomputer for immediately terminating transmission of said second control signal and said third control signal so as to permit output of said first video signal and said audio signal when said code sequence and said previous code sequence match; and said microcomputer for supplying different first control signals to said character generator so as to include an error indication in said second video signal when said code sequence and said previous code sequence match.

4. A video tape recorder having a playback mode of operation for reproducing a video tape and a standby mode of operation wherein the video tape is not reproduced and an on screen display system, said video tape recorder comprising:

a microcomputer responsive to input signals for a keyboard or a remote control receiver for controlling the video tape recorder;

a video signal processor for receiving and processing for display of a first video signal played back from a tape;

an audio processor responsive to audio signals recorded on said tape for generating voice signals;

a character generating circuit responsive to character data output from said microcomputer for generating a second video signal for display;

a mixer for receiving said first video signal and said second video signal and for mixing said first and second video signals for display;

a video mute circuit responsive to a first control output of said microcomputer for preventing said first video signal from being output to said mixer; and an audio mute circuit responsive to a second control output of said microcomputer for muting said voice signal;

said microcomputer for generating said first control output and said second control output for a period of time defined by a first input of lock key data followed by a secret code and a second input of said lock key data followed by a said secret code; and said microcomputer for immediately terminating transmission of said first control output upon expiration of said period of time.

5. The video cassette recorder according to claim 4, said microcomputer for determining if there is a lock key data input from said keyboard or said remote control when said video tape recorder is in a power-standby status and controls said character generating circuit to display a corresponding prompt message on a screen requesting a user to input a secret code one character at a time, said character generating circuit for changing said displayed prompt message to correspond to a desired one of a sequence of characters of said secret code said user is to input following an input of a previous one of said characters.

said microcomputer for storing each input character of said secret code if said input character corresponds to a numerical key of said keyboard or remote control, said microcomputer for immediately checking said video cassette recorder to determine if said video cassette recorder is in a locked state after said user completes the inputting of the secret code, said microcomputer for controlling said video mute circuit and said audio mute circuit responsive to said first control output and said second control output, respectively, to prevent output of said first video signal and to mute said voice signal if said video cassette recorder is determined not to be in said locked state, and said microcomputer for comparing said input secret code to a code previously stored if said video cassette recorder is determined to be in said locked state and, if there is a match, for determining that said period of time has expired and disabling said video mute circuit and said audio mute circuit.

6. The video tape recorder according to claim 5, said microcomputer for memorizing said secret code when it is determined that said system is not in said locked state.

7. A locking method for controlling an on-screen display system having a lock key on a keyboard or remote control, said method comprising the steps of:

checking for a key-data input signal from said keyboard or remote control during a system power standby mode of operation, and remaining in said system power standby mode of operation until said checking step identifies said key-data input signal as being indicative of an input from said lock key;

displaying prompts, on a screen, for a lock function setting state by employing an on-screen display function when the checking step identifies said key-data input signal as being indicative of an input from said lock key and sequentially storing and displaying, on said screen, a secret code input by a user in response to said prompts;

immediately determining whether the on-screen display system is in a locked state with said on-screen display system preventing viewing of any video program other than said prompts for said lock function setting state after the secret code is input to the on-screen display system;

storing the secret code as a lock code, clearing said screen of said prompts and said secret code displayed during the displaying step, and locking the on-screen display system when the determining step determines that the on-screen display system is not in said locked state;

making a comparison between the secret code and a stored lock code already in the on-screen display system when the determining step determines that the on-screen display system is in said locked state;

displaying an error message by utilizing the on-screen display function when said comparison determines that the secret code and the stored lock code do not match each other; and clearing the secret code from the screen and unlocking the on-screen display system with said on-screen display system enabling said viewing when said comparison determines that the secret code and the stored lock code match each other.

8. A locking/unlocking method for a video tape recorder system having a microcomputer for controlling the video tape recorder system, a key matrix for transmitting user input information to the microcomputer, a remote control receiver for receiving remote control signals from a remote control transmitter and converting the signals into digital key data, a video signal processor for reproducing and outputting a video signal of a video program recorded on a video tape, a sound signal processor for reproducing and outputting a sound signal of the video program recorded on the video tape, an on screen display unit for receiving alphanumeric information data from the microcomputer and displaying an image signal of the alphanumeric information data on a display screen, a mixer for mixing the video signal from the video processor and the image signal from the on screen display unit and outputting the mixed signal to a TV receiver, a video mute circuit for muting the video signal from the video processor under the control of the microcomputer, a sound mute circuit for muting the sound signal from the sound processor, said method comprising the steps of:

(a) checking for an input signal, to said microcomputer, from a lock key of said key matrix during a system power stand-by state and remaining in said stand-by state until said checking step determines said input signal has been input to said microcomputer;

(b) displaying prompts for setting a lock state of a lock setting function using an on screen display function for displaying said prompts on said display screen when said checking step determines said input signal from said lock key has been input;

(c) storing in a memory and displaying on said display screen a secret code sequentially input by a user using the key matrix in response to said prompts;

(d) immediately determining whether the lock state of said video tape recorder system is a locked state or an unlocked state after a last character of said secret code has been input;

(e) storing the input secret code as a lock secret code, clearing the display screen and locking the video tape recorder system if the lock state is determined to be in said unlocked state;

(f) comparing the input secret code with a lock code previously stored in the microcomputer if the lock state is determined to be in said locked state;

(g) displaying an error message according to the alphanumeric information data from said microcomputer said comparing step determines said input secret code doe not match said previously stored lock code; and (h) clearing the secret code from the display screen, and unlocking the video tape recorder system if said comparing step determines said input secret code matches said previously stored lock code.

* * * * *

UNITED STATES PATENT AND TRADEMARK OFFICE
CERTIFICATE OF CORRECTION

PATENT NO.   : 5,719,618
DATED        : 17 February 1998
INVENTOR(S) : Jin-Su Park It is certified that error appears in the above-indentified patent and that said Letters Patent is hereby corrected as shown below:

On the Title page,

Attorney, Agent, or Firm–    change "Robert E. Esq."

to --Robert E. Bushnell, Esq.--   .

Signed and Sealed this

Second Day of June, 1998

Attest:

BRUCE LEHMAN

*Attesting Officer*         *Commissioner of Patents and Trademarks*